(12) United States Patent
Pacheco

(10) Patent No.: US 9,416,898 B2
(45) Date of Patent: *Aug. 16, 2016

(54) FLEXIBLE CONNECTIONS

(71) Applicant: Axon EP, Inc., Houston, TX (US)

(72) Inventor: Cain Pacheco, Houston, TX (US)

(73) Assignee: Axon EP, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,018

(22) Filed: Aug. 11, 2014

(65) Prior Publication Data

US 2015/0027734 A1    Jan. 29, 2015

Related U.S. Application Data

(63) Continuation-in-part of application No. 13/871,619, filed on Apr. 26, 2013.

(60) Provisional application No. 61/639,448, filed on Apr. 27, 2012.

(51) Int. Cl.
*F16L 15/06* (2006.01)
*F16B 33/02* (2006.01)
*E21B 17/042* (2006.01)

(52) U.S. Cl.
CPC .............. *F16L 15/06* (2013.01); *E21B 17/042* (2013.01); *F16B 33/02* (2013.01)

(58) Field of Classification Search
CPC .......... E21B 17/042; F16B 33/02; F16L 15/06
See application file for complete search history.

(56) References Cited

U.S. PATENT DOCUMENTS

| 5,829,797 A * | 11/1998 | Yamamoto | F16L 15/001 |
| | | | 285/333 |
| 2011/0012347 A1* | 1/2011 | Pacheco | E21B 17/042 |
| | | | 285/333 |

* cited by examiner

*Primary Examiner* — Yong-Suk (Philip) Ro
(74) *Attorney, Agent, or Firm* — Baker Botts L.L.P.

(57) ABSTRACT

An example double shoulder threaded tool joint connection includes a pin with external threads formed between a pin external shoulder and a pin nose. The tool joint also includes a box with internal threads formed between a box face and a box internal shoulder. The box internal shoulder may have a different pitch that the pin external shoulder. The internal threads and the external threads may be arranged and designed for connection with each other so that the box and the pin are connected with a common center-line and with a primary seal formed by the pin external shoulder forced against the box face and a secondary seal formed between the pin nose forced against the box internal shoulder. The internal threads and the external threads may have stab flanks with stab flank angles of between 20° and 40° measured from a thread axis, and load flanks having first load flank angles of between 60° and 80° measured from the thread axis and second load flank angles of between 100° and 120° measured from the thread axis.

17 Claims, 5 Drawing Sheets

FLEX CONNECTION CONNECTION COMPARISION

| | TUBE BODY | | | | | | | TOOL JOINT | | | | | | | | | | |
|---|---|---|---|---|---|---|---|---|---|---|---|---|---|---|---|---|---|---|
| Size OD in. | Nominal weight lbs/ft | Wall Thickness in. | Nominal ID in. | Upset Type | Grade | Torsional Yield Strength ft-lbs | Tensile Yield Strength lbf | Connection Type | Outside Diameter in. | Inside Diameter in. | Torsional Yield Strength ft-lbs | Tensile Yield Strength lbf | Make-up Torque ft-lbs | Torsional Ratio Tool Joint to Pipe | Pin Tong Space in. | Box Tong Space in. | Connection Stiffness in⁴ | Tool Joint Stiffness in⁴ |
| 4 | 14.00 | 0.330 | 3.340 | IU | S135 | 41,900 | 513,600 | FLX389 | 4 7/8 | 2 11/16 | 50,500 | 671,400 | 30,300 | 1.21 | 12 | 15 | 19.2 | 25.2 |
|   | 14.00 | 0.330 | 3.340 | IU | S135 | 41,900 | 513,600 | NC38 | 4 7/8 | 2 9/16 | 20,194 | 842,400 | 13,980 | 0.48 | 9 | 12 | 25.1 | 25.6 |
|   | 14.00 | 0.3300 | 3.3400 | IU | S135 | 41,900 | 513,600 | NC40 | 5 1/2 | 2 9/16 | 28,100 | 838,300 | 14,600 | 0.67 | 9 | 12 | 41.7 | 42.8 |
| 4 1/2 | 16.00 | 0.337 | 3.826 | IEU | S135 | 55,500 | 595,000 | FLX460 | 6 | 3 9/16 | 75,800 | 951,900 | 45,500 | 1.37 | 12 | 15 | 43.5 | 55.7 |
|   | 16.00 | 0.337 | 3.826 | IEU | S135 | 55,500 | 595,000 | NC46 | 6 1/4 | 2 3/4 | 44,900 | 1,183,900 | 23,200 | 0.81 | 9 | 12 | 71.1 | 72.1 |
| 5 | 19.50 | 0.362 | 4.276 | IEU | S135 | 74,100 | 712,100 | FLX500 | 6 1/4 | 3 1/2 | 95,000 | 1,135,900 | 57,000 | 1.28 | 12 | 15 | 54.2 | 67.5 |
| 5 | 19.50 | 0.362 | 4.276 | IEU | S135 | 74,100 | 712,100 | FLX522 | 6 5/8 | 3 9/16 | 113,800 | 1,323,100 | 68,300 | 1.54 | 12 | 15 | 71.5 | 86.7 |
|   | 19.50 | 0.362 | 4.276 | IEU | S135 | 74,100 | 712,100 | NC50 | 6 5/8 | 2 3/4 | 63,400 | 1,551,700 | 32,900 | 0.86 | 9 | 12 | 90.4 | 91.8 |
| 5 1/2 | 21.90 | 0.361 | 4.778 | IEU | S135 | 91,300 | 786,800 | FLX551 | 6 5/8 | 4 1/2 | 92,200 | 1,071,100 | 55,300 | 1.01 | 12 | 15 | 60.7 | 78.5 |
|   | 21.90 | 0.361 | 4.778 | IEU | S135 | 91,300 | 786,800 | 5-1/2 FH | 7 1/4 | 3 1/2 | 72,500 | 1,619,200 | 37,400 | 0.79 | 10 | 12 | 124.4 | 128.3 |
| 5 1/2 | 24.70 | 0.415 | 4.670 | IEU | S135 | 101,800 | 895,000 | FLX579 | 7 1/8 | 4 5/16 | 132,700 | 1,394,900 | 79,600 | 1.30 | 12 | 15 | 90.0 | 109.5 |
|   | 24.70 | 0.415 | 4.670 | IEU | S135 | 101,800 | 895,000 | 5-1/2 FH | 7 1/2 | 3 1/4 | 80,400 | 1,778,300 | 41,200 | 0.79 | 10 | 13 | 146.0 | 149.8 |
| 6 5/8 | 27.70 | 0.362 | 5.901 | IEU | S135 | 137,300 | 961,600 | FLX691 | 8 1/4 | 5 1/2 | 153,300 | 1,562,200 | 92,000 | 1.12 | 12 | 15 | 147.6 | 182.5 |
|   | 27.70 | 0.362 | 5.901 | IEU | S135 | 137,300 | 961,600 | 6-5/8 FH | 8 1/4 | 4 1/2 | 109,200 | 2,102,300 | 56,100 | 0.80 | 10 | 13 | 237.3 | 240.2 |
| 7 5/8 | 33.00 | 0.430 | 6.765 | IEU | S135 | 214,900 | 1,312,100 | FLX691 | 8 1/4 | 5 1/2 | 153,300 | 1,562,200 | 92,000 | 0.71 | 12 | 15 | 147.6 | 182.5 |

Fig. 3

FLEXIBLE CONNECTIONS

CROSS REFERENCE TO RELATED APPLICATIONS

This application is a continuation-in-part of U.S. patent application Ser. No. 13/871,619, entitled "Flexible Connections," and filed Apr. 26, 2013 which claims priority to U.S. Provisional Patent Application No. 61/639,448 filed Apr. 27, 2012, both of which are herein incorporated by reference in their entirety for all purposes.

BACKGROUND

Highly deviated drilling programs and horizontal wells are becoming widely used to access reservoirs. Due to the steep angle of these deviated wells, high bending stresses are induced in drill pipes that rotate within curved portions of the well. With these high bending stresses, the drill pipe connections may develop fatigue cracks at their thread roots. These fatigue cracks can lead to washouts or even failure. It has previously been established in conventional "V" threads that increasing the root radius of the thread form aids in the reduction of the connections' peak stresses. Most drill pipe manufactures are now designing connections to help in the reduction on the connection fatigue stresses by applying this method.

In developing these new connections by the above mentioned method, designers have to compromise with the reduction in torque and or tensile capacity of the connection due to the geometry of the connection, which is highly affected by the thread form design. In some cases, designers will have to undercut the threads to produce a larger root radius. These undercuts may further reduce the performance of the connection in torque and tensile capacity.

Taking in mind the above current design status of the drill pipe connections in the existing market, there is a need to develop a change in geometry evolving from the conventional "V" threads to achieve not only a high level of fatigue resistance to bending stresses, but also to achieve higher torque and tensile requirements within the given design area. In addition, it is also desirable to develop a threaded connection that forms a slim hole profile design in order to minimize the pressure loss within the well and to aid in the removal of cuttings and debris from the well.

SUMMARY

The present invention relates to a threaded tool joint connections. More particularly, in certain embodiments, the present invention relates to threaded tool joint connections comprising multi-surface load flanks.

An example double shoulder threaded tool joint connection includes a pin with external threads formed between a pin external shoulder and a pin nose. The tool joint also includes a box with internal threads formed between a box face and a box internal shoulder. The box internal shoulder may have a different pitch that the pin external shoulder. The internal threads and the external threads may be arranged and designed for connection with each other so that the box and the pin are connected with a common center-line and with a primary seal formed by the pin external shoulder forced against the box face and a secondary seal formed between the pin nose forced against the box internal shoulder. The internal threads and the external threads may have stab flanks with stab flank angles of between 20° and 40° measured from a thread axis, and load flanks having first load flank angles of between 60° and 80° measured from the thread axis and second load flank angles of between 100° and 120° measured from the thread axis.

The features and advantages of the present invention will be readily apparent to those skilled in the art. While numerous changes may be made by those skilled in the art, such changes are within the spirit of the invention.

BRIEF DESCRIPTION OF THE DRAWINGS

A more complete and thorough understanding of the present embodiments and advantages thereof may be acquired by referring to the following description taken in conjunction with the accompanying drawings.

FIG. 3 is a chart comparing the attributes of one embodiment of the flexible tool joint connection disclosed herein with several conventional tool joint connections.

DETAILED DESCRIPTION

Figure 1:
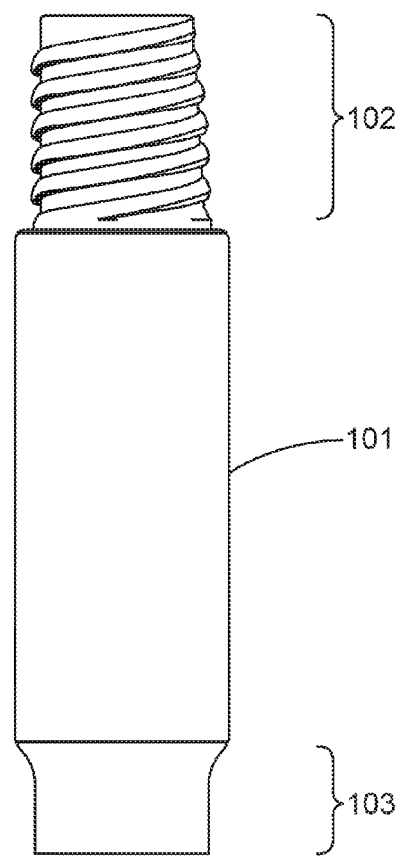
FIG. 1 is an illustration of a drill pipe comprising an external mating shoulder in an internal mating shoulder in accordance with certain embodiments of the present disclosure.

The present invention relates to a threaded tool joint connections. More particularly, in certain embodiments, the present invention relates to threaded tool joint connections comprising multi-surface load flanks.

The current disclosure is aimed at evolving from a conventional "V" thread and moving on to a more "trapezoidal" thread form that will allow for larger root surface as well as keeping the connections' male and female members engaged at their critical load bearing contact areas while a bending moment is being applied to the tool joint connection. This design will also encompass high torsional and tensile capacity as well as reach a high level of fatigue cycles due to the geometry of the trapezoidal thread form, all while maintaining a slim hole geometry. The design may maintain minimal cross-sectional area at the connections critical design areas. The threaded connections discussed herein may have threads that will be on a taper and will have multiple leads/multiple starts, preferably two.

There may be several potential advantages of using the thread forms and threaded connections disclosed herein. One of the many potential advantages of the thread forms disclosed herein is that they may provide for multi-surface contact load flanks. In certain embodiments, threaded tool joints comprising the thread forms disclosed herein are able to have interlocking load flanks because of the negative angles of the thread form. This, along with the radii on the stab flanks, allows the connection to interlock itself due to the push-off at the stab flank radii interference towards the load flanks.

Another potential advantage to the thread forms disclosed herein, is that they may provide for a large root radii. This is achieved based on the negative angles of the thread form the 2° angle on the stab flank and 20° angle on the load flank, this widens the thread form which allows for a very large root radius to be used.

The large root radii may increase the connections' critical cross-sectional area by not having such an undercut at the thread root. In certain embodiments, the thread forms disclosed herein may allow for a cross-section area that is less than 70%. The distance from the design's pitch line to the root of the thread may be kept fairly small in comparison to most "V" threads, which allows for more metal between the connections outer diameter and inner diameter. Although the connections discussed herein may still have thick connections, the design's stiffness ratio is decreased making the connection more flexible than the present designs.

Another potential advantage to the thread forms disclosed herein, is that they may provide for large flank angles. This is achievable due to the load and stab flank angles having a negative degree from the vertical axis. For example, the stab flanks may have 60° angle from the vertical axis and the stab flank angle having a 20° angle from the vertical axis of the connection. This provides for an included angle of 40°.

Another potential advantage to the thread forms disclosed herein, is that they may provide for a two to three turn connection. This may be achieved by having a double lead thread design, a large number of threads per inch, or a combination of tapers ranging from 0.750" to 1.125". In certain embodiments, the threaded connections discussed herein may range from 2.09 turns to 3.22 turns.

Another potential advantage to the thread forms disclosed herein, is that they may provide for an increased torque capacity. The thread forms described herein may provide for a 10% to 150% increase in torque depending on the connection. The trapezoidal thread form allows for more load and stab flank engagement which helps with gaining more surface area for torque. This in turn allows for a shorter connection with the same shear strength to withstand any thread shear due to torque and also allow for the connection to remain engaged under severe bending moments or dog leg severities.

In certain embodiments, the present disclosure provides for a double shoulder tool joint connection, where the connection will have an external mating shoulder and an internal mating shoulder, this will aid in producing additional surface area for the higher torque requirements. FIG. 1 illustrates drill pipe 101 comprising an external mating shoulder 102 and an internal mating shoulder 103 with thread forms in accordance with certain embodiments of the present disclosure.

Figure 2:
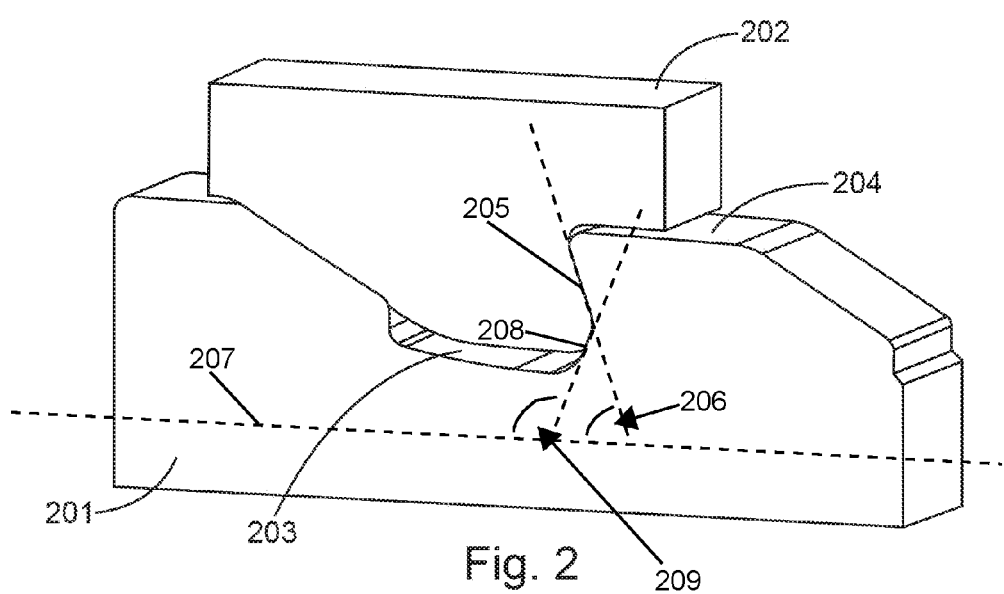
FIG. 2 is an illustration of a partial view of the threaded connection of two joints in accordance with certain embodiments of the present disclosure.

FIG. 2 illustrates a partial view of the threaded connection of two joints in accordance with certain embodiments of the present disclosure.

In certain embodiments, the thread forms of the present disclosure may comprise an external or male thread form 201 having a stab flank angle of from about 20° to about 40° from the thread axis. In certain embodiments, as shown in FIG. 2, the external or male thread form 201 may have a stab flank having an angle of 30° from the thread axis. In certain embodiments, the external or male thread form 201 may have a load flank angle of from about 60° to about 80° from the thread axis. In certain embodiments, as shown in FIG. 2, the external or male thread form 201 may have a load flank having an angle of 70° from the thread axis. Additionally, in certain embodiments, the load flank may encompass more surface area by having an additional positive flank angle which is equal, but opposite in direction of the first flank angle.

In certain embodiments, the thread forms of the present disclosure may comprise an internal or female thread form 202 having a stab flank angle of from about 20° to about 40° from the thread axis. In certain embodiments, as shown in FIG. 2, the internal or female thread form 202 may have a stab flank having an angle of 30° from the thread axis. In certain embodiments, the internal or female thread form 202 may have a first planar contact surface 205 with a load flank angle 206 of from about 60° to about 80° from the thread axis 207. In certain embodiments, as shown in FIG. 2, the internal or female thread form 202 may have a load flank having an angle of 70° from the thread axis. The internal or female thread form 202 may have a second planar contact surface 208 with a load flank angle 209 of from about 100° to about 120° from the thread axis 207. Additionally, in certain embodiments, the load flank may encompass more surface area by having an additional positive flank angle which is equal, but opposite in direction of the first flank angle.

In certain embodiments, the thread form may have supplementary radii at all corners to reduce any stress risers that could occur due to the bending loads.

As shown in FIG. 2, when the tool joint is assembled, the thread root 203 and thread crest 204 will not be in engagement. The root surface will still have a small flat area that is parallel to the pitch line of the threads. The thread will have an undercut area that will help in increasing the root surface, but will not diminish the performance from the threaded connection.

Referring now to FIG. 3, FIG. 3 illustrates a chart comparing the attributes of one embodiment of the flexible tool joint connection disclosed herein with several conventional tool joint connections.

Figure 4:
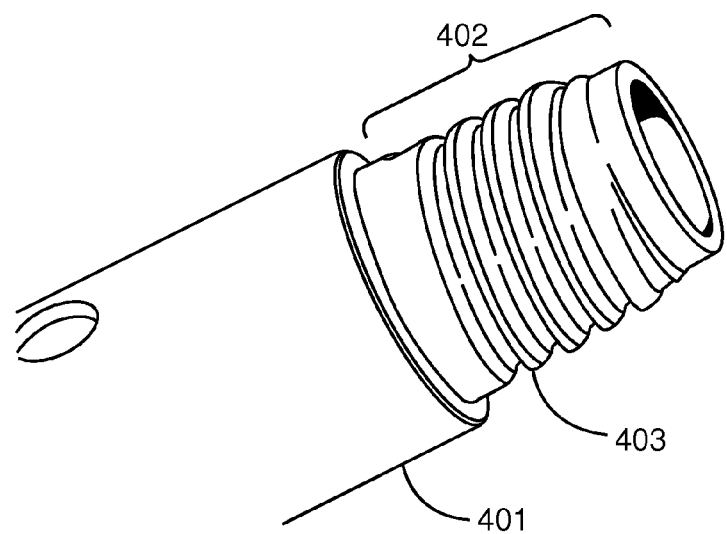
FIG. 4 is an illustration of a drill pipe comprising a thread design in accordance with certain embodiments of the present disclosure.

Referring now to FIG. 4, FIG. 4 illustrates drill pipe 401 comprising an external mating shoulder 402 with external or male thread form 403 in accordance with certain embodiments of the present disclosure.

Figure 5:
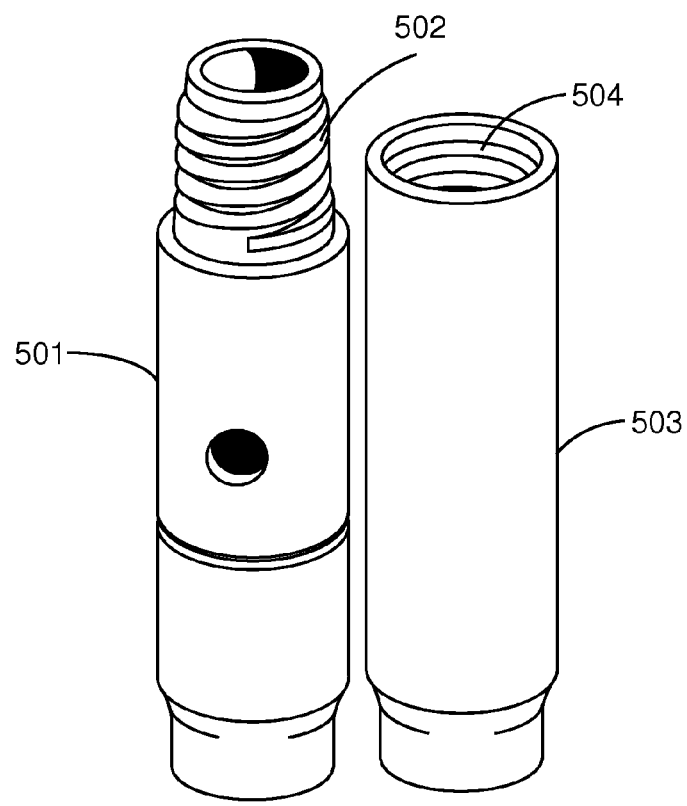
FIG. 5 is an illustration of two drill pipes comprising thread designs in accordance with certain embodiments of the present disclosure.

Referring now to FIG. 5, FIG. 5 illustrates drill pipe 501 comprising external or male thread form 502 in accordance with certain embodiments of the present disclosure. FIG. 5 further illustrates drill pipe 503 comprising internal or female thread form 504, which is partially obscured by the external surface of drill pipe 503.

Figure 6:
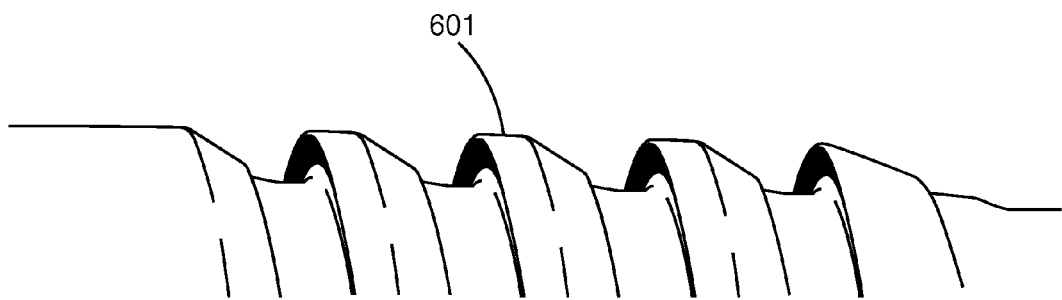
FIG. 6 is an illustration of a thread design in accordance with certain embodiments of the present disclosure.

Referring now to FIG. 6, FIG. 6 illustrates external or male thread form 601 in accordance with certain embodiments of the present disclosure.

Figure 7:
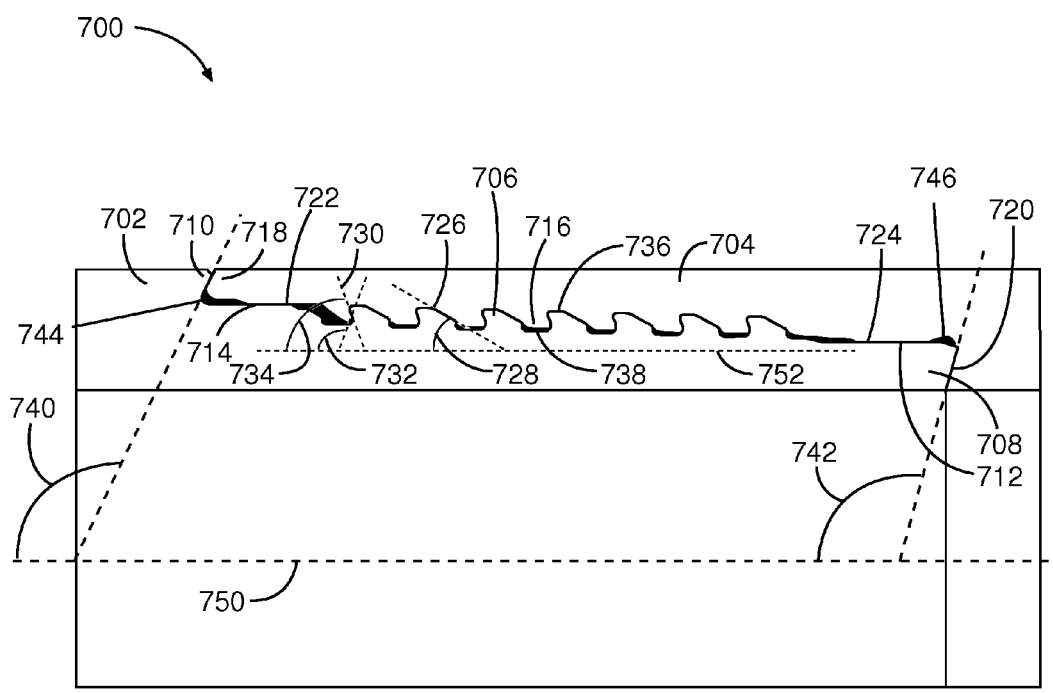
FIG. 7 is an illustration of a threaded connection in accordance with certain embodiments of the present disclosure.

FIG. 7 is an illustration of a threaded connection 700 of a joint between two pipes or tubulars, such as in a high temperature, high pressure (HPHT) casing and tubing connection. The connection 700 comprises a pin 702 integrated into a first pipe or tubular, and a box 704 integrated into a second pipe or tubular. The pin 702 comprises external threads 706 between a pin nose 708 and a pin external shoulder 710. The pin 702 may further comprise a first surface 712 between the external threads 706 and the pin nose 708, and a second surface 714 between the external threads 706 and the pin external shoulder 710. Similarly, the box 704 comprises internal threads 716 formed between a box face 718 and a box internal shoulder 720. Additionally, the box 704 may comprise a first surface 722 between the internal threads 716 and the box face 718, and a second surface 724 between the internal threads 716 and the box internal shoulder 720.

The internal threads 716 and the external threads 706 are arranged and designed for connection with each other so that the box 704 and the pin 702 are connected with a common center-line 750. When the threaded connection 700 is "made up," the box 704 and pin 702 may form one or more seals, such as metal-on-metal seals based on an interference fit between adjacent portions of the box 704 and pin 702. In certain embodiments, a first or primary seal may be formed when the pin external shoulder 710 is forced against the box face 718, and a second or secondary seal may be formed when the pin nose 708 is forced again the box internal shoulder 720. Other seals may be formed by the box 704 and pin 702. For example, a metal-to-metal seal may be formed between the pin first surface 712 and the box second surface 724, and another metal-to-metal seal may be formed between the box first surface 722 and the pin second surface 714.

In the embodiment shown the internal threads 716 and external threads 706 may have a common thread axis 752, which may be the same as or parallel to the pitch line of the threads 716 and 706. In the embodiment shown, the internal threads 716 and external threads 706 may have stab flanks 726 with a stab flank angle 728 measured from the thread axis 752. The stab flank angle 728 may comprise stab flanks angle between about 20° and 40°. In the embodiment shown, the internal threads 716 and external threads 706 also may have load flanks 730 on an opposite side of the threads from the stab flanks 726 with a first load flank angle 734 and a second load flank angle 732. The first load flank angle 734 may comprise load flank angles of between about 60° and 80°, and the second load flank angle 732 may comprise load flank angles of between about 100° and 120°. Additionally, the thread roots 736 and 738 of the box 704 and pin 702, respectively, may be parallel with the thread axis 752.

In the embodiment shown, the pin external shoulder 710 and the box internal shoulder 720 may have variable pitches, or angles with respect to the center line 750. For example, the pin external shoulder 710 may form a first pitch or angle 740, with respect to the center line 750. The box face 718 may have a similar pitch as the pin external shoulder 710 with respect to the center line 750. In the embodiment shown, the angle 740 is between about 100° and 120°. In contrast, the box internal shoulder 720 may form a second pitch or angle 742, between about 95° and 110°. The pin nose 708 may have a similar pitch as the box internal shoulder 720 with respect to the center line 750. The variable pitch angles between the internal and external shoulders may improve the seal between the box 704 and pin 702, as well as improve the strength of the threaded connection 700.

In certain embodiments, one or more of the internal and external box and pin shoulders may comprise an undercut portion. The pin external shoulder 710 and box face 718, for example, form a gap 744 when the connection is "made up." The gap 744 may be formed, at least in part, by an undercut in the pin near the pin external shoulder 710 that increases the space between part of the pin neck portion 714 and the end of the box 704. The gap 744 also may be formed, in part, by a tapering in the box 704 near the box face 718. A similar gap 746 is shown with respect to the pin nose 708 and the box internal shoulder 720, where an undercut in the box 704 at the box internal shoulder 720 and a rounded portion of the pin nose 708 combine to form the gap 746. The gaps 746 and 744 may reduce the stress felt across the threaded connection in response to various internal and external forces, by allowing some relative movement by the pin nose 708 with respect to the box internal shoulder 720 and by the box face 718 with respect to the pin external shoulder 710.

The thread designs discussed herein may be used in a number of applications. For example, the thread designs discussed herein may be used in drill pipe tool joint connections, production casing connections, drilling riser connections, production riser casing connections, expandable casing connections, HPHT drill pipe connections with metal-to-metal seals, HPHT casing connections, expandable casing connections, and marine riser connections.

According to aspects of the present disclosure, an example method may include providing a first tubular with a pin section comprising external threads formed between a pin external shoulder and a pin nose. The external threads may comprise stab flanks having stab flank angles of between 20° and 40° measured from the thread axis; and load flanks having first load flank angles of between 60° and 80° measured from the thread axis and second load flank angles of between 100° and 120° measured from the thread axis. The method may also include providing a first tubular with a box section comprising internal threads formed between a box face and a box internal shoulder. The box internal shoulder comprises a different pitch that the pin external shoulder. The method may also include engaging the box and the pin to form a primary seal between the pin external shoulder and the box face, and a secondary seal between the pin nose and the box internal shoulder.

In certain embodiments, at least one of the first and second tubulars comprise at least one of a drill pipe segment, a downhole tool, a production casing, a drilling riser, a production riser, an expandable casing, and high-pressure, high-temperature casing. In certain embodiments, both the first and second tubular may comprise the same type of tubular. In other embodiments, the first and second tubulars may be of different types, such as a downhole tool and a drill pipe segment. HPHT casings may be useful in extreme drilling conditions and may withstand higher temperature and pressures than conventional casings or pipes.

In certain embodiments, the present disclosure provides a dual shoulder drill pipe connection with a thread profile that provides an improved torque connection designed to push the limits of performance on a double shoulder tool joint connection in torque, tension, and fatigue performance along with rapid make-up speed. In certain embodiments, the multi-surface contact load flanks, trapezoidal thread profile, and dual shoulder design allow the connection to reach increased torques while still maintaining a streamline geometric design. In certain embodiments, the torque capacities may average 10%-150% greater than API connections and 10% -71% greater than most proprietary double shoulder proprietary connections of the same dimensions.

In certain embodiments, the thread designs discussed herein may enhance critical cross-sectional areas, provide additional load flank areas, and provide shoulder contact areas to increase the mechanical properties connections over other thread designs. In certain embodiments, the thread designs discussed herein may take advantage of 135 ksi specified material yield strength (SMYS) to further increase the performance of the connection. In certain embodiments, the thread designs discussed herein may allow for a large root surface area, which reduces peak stresses within the connection, reduces connection stiffness, and increases fatigue resistance.

In certain embodiments, the thread designs discussed herein may takes advantage of multiple thread starts within their design to reduce the amount of revolutions required to make-up the connection to its recommended make-up torque. This turns to make-up throughout the design may vary from 2.1 to 3.2 turns depending on the size of the connection.

In certain embodiments, the thread designs discussed herein may reduce connection stiffness and peak stress. In certain embodiments, the combination of multiple starts, large leads, and the thread form allow the connections to retain smaller outer dimensions and larger internal dimensions creating a reduction in tool joint and connection stiffness from 23%-51% from conventional tool joint connections. In addition, the large radii on the thread roots may aid in decreasing the connection stiffness reducing the peak stresses within the connection associated with bending loads, thus allowing for a long fatigue life.

In certain embodiments, the thread designs discussed herein may increase connection wear life. The connections may have an increased tool joint/drill pipe torsional ratio of 1.2 that allows the connection a significant reduction in OD wear before reaching a premium OD that is equal to that of the pipe body 80% torsional strength. This may be a ½" to 1" outer diameter wear reduction from the connections new outer diameter.

In certain embodiments, the thread design discussed herein may be designed for performance, enhance torque capacity, allow for a rapid make-up torque, allow for an increased wear life, extend fatigue performance, reduce connection stiffness and peak stress, and allow for a larger ID for improved hydraulics.

Although the present invention and its advantages have been described in detail, it should be understood that various changes, substitutions and alternations can be made herein without departing from the spirit and scope of the invention as defined by the following claims.

What is claimed is:

1. A double shoulder threaded tool joint connection comprising:
   a pin with external threads formed between a pin external shoulder and a pin nose;
   a box with internal threads formed between a box face and a box internal shoulder, wherein the box internal shoulder comprises a different pitch that the pin external shoulder;
   wherein the internal threads and the external threads are arranged and designed for connection with each other so that the box and the pin are connected with a common center-line and with a primary seal formed by the pin external shoulder forced against the box face and a secondary seal formed between the pin nose forced against the box internal shoulder and
   wherein the internal threads and the external threads comprise:
      stab flanks having stab flank angles of between 20° and 40° measured from a thread axis and
      load flanks characterized by first and second planar contact surfaces, the first planar contact surfaces having first load flank angles of between 60° and 80° measured from the thread axis, and the second planar contact surfaces having second load flank angles of between 100° and 120° measured from the thread axis.

2. The double shoulder threaded tool joint connection of claim 1, wherein the box and pin are arranged and designed for connection with each other so that the box and the pin when connected form a first metal-to-metal seal comprising at least a portion of the pin between the pin external shoulder and the external threads, and a second metal-to-metal seal comprising at least a portion of the pin between the pin nose and the external threads.

3. The double shoulder threaded tool joint connection of claim 1, wherein the box internal shoulder shares a common pitch with the pin nose; and
   the pin external shoulder shares a common pitch with the box face.

4. The double shoulder threaded tool joint connection of claim 1, further comprising at least one of
   an undercut portion of the box proximate to the box internal shoulder;
   an undercut portion of the pin proximate to the pin external shoulder;
   a rounded or tapered portion at the pin nose; and
   a rounded or tapered portion at the box face.

5. The double shoulder threaded tool join connection of claim 1, wherein the internal and external threads further comprise thread roots and thread crest that are not in engagement.

6. The double shoulder threaded tool join connection of claim 1, further comprising supplemental radii at all corners.

7. A threaded drill pipe comprising:
   an external mating shoulder having a first pitch with respect to a center-line of the pipe;
   an internal mating shoulder having a second pitch, different than the first pitch, with respect to the center-line of the pipe;
   an external thread form between the external mating shoulder and the internal mating shoulder, wherein the external thread form comprises:
   a stab flank having a stab flank angle of between 20° and 40° measured from the thread axis;
   a first load flank characterized by a first planar contact surface having a first load flank angle of between 60° and 80° measured from the thread axis; and
   a second load flank characterized by a second planar contact surface having a second load flank angle of between 100° and 120° measured from the thread axis.

8. The threaded drill pipe of claim 7, wherein the external thread form further comprises a root surface that is parallel with the thread axis.

9. The threaded drill pipe of claim 7, wherein the external thread form further comprises an undercut area.

10. The threaded drill pipe of claim 7 further comprising supplemental radii at all corners.

11. The threaded drill pipe of claim 7, further comprising:
    an internal thread form, wherein the internal thread form comprises:
    a stab flank having a stab flank angle of between 20° and 40° measured from the thread axis;
    a first load flank having a first load flank angle of between 60° and 80° measured from the thread axis; and
    a second load flank having a second load flank angle of between 100° and 120° measured from the thread axis.

12. The threaded drill pipe of claim 11, wherein the internal thread form and external thread form further comprise thread roots and thread crests that are not in engagement.

13. A method comprising,
    providing a first tubular with a pin section comprising external threads formed between a pin external shoulder and a pin nose, wherein the external threads comprises stab flanks having stab flank angles of between 20° and 40° measured from the thread axis; and
    load flanks characterized by first and second planar contact surfaces, the first planar contact surfaces having first load flank angles of between 60° and 80° measured from the thread axis, and the second planar contact surfaces having second load flank angles of between 100° and 120° measured from the thread axis;
    providing a first tubular with a box section comprising internal threads formed between a box face and a box internal shoulder, wherein the box internal shoulder comprises a different pitch that the pin external shoulder;
    engaging the box and the pin to form a primary seal between the pin external shoulder and the box face, and a secondary seal between the pin nose and the box internal shoulder.

14. The method of claim 13, further comprising engaging the box and the pin to form a first metal-to-metal seal comprising at least a portion of the pin between the pin external shoulder and the external threads, and a second metal-to-metal seal comprising at least a portion of the pin between the pin nose and the external threads.

15. The method of claim 13, wherein
   the box internal shoulder shares a common pitch with the pin nose; and
   the pin external shoulder shares a common pitch with the box face.

16. The method of claim 13, further comprising at least one of an undercut portion of the box proximate to the box internal shoulder;
   an undercut portion of the pin proximate to the pin external shoulder;
   a rounded or tapered portion at the pin nose; and
   a rounded or tapered portion at the box face.

17. The method of claim 13, wherein at least one of the first and second tubulars comprise at least one of a drill pipe segment, a downhole tool, a production casing, a drilling riser, a production riser, an expandable casing, and high-pressure, high-temperature casing.

\* \* \* \* \*